United States Patent [19]  [11]  4,442,267
Charnock  [45]  Apr. 10, 1984

[54] HEAT RESISTANT TOUGHENED ADHESIVE COMPOSITION

[75] Inventor: Ronald S. Charnock, Celbridge, Ireland

[73] Assignee: Loctite (Ireland) Limited, Tallaght, Ireland

[21] Appl. No.: 476,395

[22] Filed: Mar. 17, 1983

[51] Int. Cl.$^3$ .............................................. C08F 255/02
[52] U.S. Cl. .................................... 525/309; 525/305; 523/176
[58] Field of Search ......................................... 525/309

[56] References Cited

U.S. PATENT DOCUMENTS

| | | | |
|---|---|---|---|
| 4,007,322 | 2/1977 | House | 525/303 |
| 4,048,259 | 9/1977 | Wegemund | 525/301 |
| 4,126,504 | 11/1978 | Wolinski | 156/310 |
| 4,138,449 | 2/1979 | Baldwin | 525/310 |
| 4,287,317 | 9/1981 | Kitagawa | 525/309 |
| 4,293,665 | 10/1981 | Zalucha | 525/255 |

*Primary Examiner*—Paul R. Michl
*Attorney, Agent, or Firm*—Walter J. Steinkraus; Eugene F. Miller

[57] ABSTRACT

A structurally toughened heat resistant adhesive composition comprising a solution of a polyacrylic elastomer in polymerizable acrylate ester monomers. The adhesive composition also contains an adhesion promoter, a cross-linking agent, a free-radical generator and a free-radical accelerator. The adhesive compositions are generally used as two-part systems, and yield bonds with improved heat and solvent resistant properties. The polymerizable acrylate ester monomers may be monofunctional or a combination of mono- and polyfunctional monomers. Among the useful classes of monomers are alkyl and cycloalkyl acrylates, alkyl and cycloalkyl methacrylates, alkoxy acrylates and methacrylates, alkylene diacrylates and dimethacrylates. A few of the preferred monomers are methyl methacrylates, lauryl methacrylates, isobornyl methacrylates, and tetrahydrofurfuryl methacrylates. The preferred acrylic rubbers are generally the homopolymers of alkyl esters of acrylic or methacrylic acid; homopolymers of alkoxy esters of acrylic or methacrylic acid; or copolymers of either of these with a lower alkene. Most preferred are the rubbers formed from the copolymerization of ethyl acrylate with 2-chlorethyl vinyl ether, or from the copolymerization of ethylene, methyl acrylate and a third monomer containing carboxylic curing sites.

12 Claims, No Drawings

HEAT RESISTANT TOUGHENED ADHESIVE COMPOSITION

CROSS REFERENCE TO RELATED APPLICATION

This application is a continuation of Ser. No. 281,265, filed July 8, 1981, now abandoned.

BACKGROUND OF THE INVENTION

Disclosed in the prior art are adhesive compositions based on solutions of elastomeric polymers in polymerizable vinyl monomers. The compositions usually exhibit reasonably good storage stability and cure rapidy to strong, tough bonds. The compositions cure in the presence of air at room temperature, usually with the aid of various polymerization catalysts; e.g., free-radical generators, initiators, promoters, and accelerators.

Examples of such adhesive compositions can be found in U.S. Pat. Nos. 3,810,407, 3,962,372, 4,112,013, 4,118,436, 3,994,764, 3,832,274, and 4,138,449. Adhesive compositions formulated from these patents have several shortcomings which make them ineffective in applications which involve extreme environmental conditions.

One major disadvantage is their inability to maintain their structural properties such as tensile shear strength, T-peel and impact after significant exposure to high temperature aging. The chlorosulfonated polyethylene, polychloroprene and polyurethane rubber based adhesive compositions are limited, with respect to their maximum useful service, to temperatures less than 110° C. All of these adhesives require the addition of reasonably large amounts of epoxy resins to improve high temperature resistance. However, high temperature improvements in this manner are not always substantial enough to meet the requirements of many high temperature applications, and often are merely temporary.

A particular disadvantage of the poly(butadiene) based adhesive compositions is that they are soluble in relatively few monomers. Recent legislation regarding hazardous organic solvents has focused on the need to replace high volatile monomers with low volatility, high boiling-point monomers. The prior art rubbers (elastomers) are generally not sufficiently soluble in low volatility methyl methacrylate monomers to allow a useful product to be formulated.

Furthermore, unsaturated diene elastomers, notably the poly (styrene-co-butadiene) and poly(butadiene) polymers, show poor resistance to the individual or combined effect of molecular oxidation and ozonation, both at elevated and normal temperatures. These formulations also exhibit poor resistance to sunlight exposure, UV radiation, and various adverse environmental aging conditions, such as extremes in temperature combined with moisture or solvents. As a result of the cross-linking reactions of these butadiene polymers, embrittlement of the polymer generally occurs. To overcome extreme embrittlement, antioxidants, antiozonants, UV absorbers, oils and waxes often must be used as protective agents or to provide protective surfaces. Yet, such additions of materials would be expected to influence the free-radical catalyzation reactions which could result in delayed or retarded cure speed. Other disadvantages of the diene elastomers include the poor resistance to oil, solvent, acid and alkali materials and the inability to crystalize upon distortion, all of which act to decrease the structural integrity of the polymer and hence decrease the bond strength. The polychloroprene-type elastomers cure to give rigid, brittle bonds that cannot withstand substantial impact shock or peeling forces.

It is evident that there is a need for an adhesive composition which when cured, provides excellent bond strengths and exhibits toughness and resistance to environmental conditions, particularly high temperature, for extended periods of time.

The adhesive compositions of this invention are designed to overcome these traditional problems of the prior art.

SUMMARY OF THE INVENTION

This invention relates to fast curing free-radical catalyzed structural adhesives, which form bonds of high tensile shear strength and high T-peel strength when cured. The adhesives described herein are generally formulated as two-part adhesives, the first part comprising at least one polymerizable acrylate ester monomer, and at least one acrylate rubber soluble in the monomer, an adhesion promoter, and a free radical initiator system; the second part comprising an activator.

More particularly, this invention relates to two-part adhesive compositions of the polymer-in-monomer type, wherein the polymer is dissolved in the monomer, along with the adhesion promoter and the free radical catalyst system. This solution serves as the first part of the adhesive composition. The second part of the composition is an activator, which is usually applied as a primer or coating to a substrate prior to bonding. The polymer-in-monomer solution can either be applied directly over the activated surface of the substrate or on another substrate to be mated with the first. These adhesive compositions are essentially 100% reactive and do not rely in any way on the loss or evaporation of organic solvents or water to cure.

One advantage of these adhesive compositions is that they exhibit excellent resistance to high temperature heat aging and do not require the addition of large amounts of expensive epoxy resins, as does the prior art. The adhesive compositions retain their high tensile shear strength and high T-peel strengths after exposure to temperatures of up to 180° C. for periods of a week or more. Such improvements are of particular importance in applications which involve high temperature exposure for long periods of time; e.g., automobile applications where adhesive bonded car components must withstand paint baking cycles in excess of 150° C. for periods of up to several hours.

Another object of this invention is to provide an ultraviolet curing, toughened adhesive composition which has excellent resistance to sunlight, UV radiation, adverse weather conditions and solvents, without the need for such additives as antioxidants, antiozonants, UV absorbers, oils or waxes.

The invention further provides adhesive compositions that upon cure yield bonds which can withstand high impact shock and peeling forces, at room temperature as well as at temperature extremes.

The instant adhesive compositions are fast curing, easy to use compositions which exhibit excellent shelf-life stability, and are capable of bonding a wide variety of substrates. When cured, these compositions provide excellent resistance to temperatures ranging from about −40° C. to about 205° C., oils at elevated temperatures (including sulfur bearing types), moisture and humidity, oxidation and ozonation, aliphatic solvents, sunlight discoloration, weathering, and gas permeation.

DETAILED DESCRIPTION OF THE INVENTION AND ITS PREFERRED EMBODIMENTS

The polymerizable acrylate ester monomers may be monofunctional or a combination of mono- and polyfunctional monomers. Generally, the monomers are exemplified but not limited to those selected from the class consisting of alkyl acrylates, cycloalkyl acrylates, alkyl methacrylates, cycloalkyl methacrylates, alkoxy acrylates, alkoxy methacrylates, alkylene diacrylates and alkylene dimethacrylates. Among the preferred monofunctional monomers are methyl methacrylate, lauryl methacrylate, 2-ethyl hexyl methacrylate, ethyl methacrylate, n-butyl methacrylate, iso-butyl methacrylate and t-butyl methacrylate. The most preferred are those monomers which have high boiling points and low volatility characteristics, including such monomers as tetrahydrofurfuryl methacrylate, cyclohexyl methacrylate, isobornyl methacrylate, hydroxethyl methacrylate and hydroxypropyl methacrylate.

The monofunctional monomers mentioned above may generally be represented by the formula:

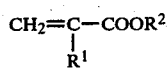

$$CH_2=C-COOR^2 \quad\quad\quad I.$$
$$\phantom{CH_2=}\overset{|}{R^1}$$

wherein $R^1$ is H, $CH_3$ or lower alkyl, $R^2$ is H, alkyl, alkoxy cycloalkyl or alkylene group.

The effective range of the polymerizable acrylate ester monomer to be used in the instant compositions may vary somewhat depending on the specific properties desired, but generally 10–90% by weight of the composition is desirable, and preferably within the range of 30–80% by weight thereof. Adjustments within these ranges are easily made within the skill of the art.

It may be undesirable to add a polyfunctional monomer to the composition as well. When this is done it generally should be in the range of about 1–40% by weight, depending on the specific polyfunctional monomer. The preferred polyfunctionals are dimethacrylates of various glycols. These monomers are disclosed in U.S. Pat. No. 3,218,305, and are of the general formula:

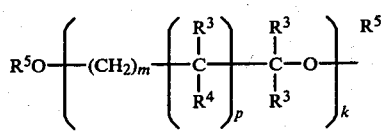

II.

wherein $R^3$ is H, $C_{1-4}$ alkyl or hydroxyalkyl or $R^5OCH_2$—; $R^6$ is H, halogen or $C_{1-4}$ alkyl; $R^4$ is H, OH or $R^5O$—; $R^5$ is $CH_2=C(R)^6 C(=O)$—; m is an integer, preferably 1 to 8; k is an integer, preferably 1 to 20; and p is 0 or 1.

Examples of some preferred glycol dimethacrylates of this formula are polyethylene glycol dimethacrylate and dipropylene glycol dimethacrylate, to name a few.

Other suitable polymerizable acrylate ester monomers which may be employed are described in U.S. Pat. No. 4,018,851, having the general formula:

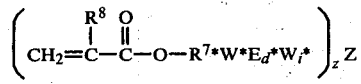

III.

wherein $R^8$ is selected from the class consisting of hydrogen, chlorine, and methyl and ethyl radicals; $R^7$ is a bivalent organic radical selected from the group consisting of lower alkylene of 1–8 carbon atoms, phenylene, and naphthylene; W is a polyisocyanate radical; E is an aromatic, heterocyclic or cycloaliphatic polyol or polyamine radical, preferably a diol, and more preferably a diol of a cycloaliphatic compound; d is either 1 or 0; i is 0 when d is 0, and otherwise equal to one less than the number of reactive hydrogen atoms of E; wherein Z is a (i) polymeric or copolymeric grafted alkylene ether polyol radical or (ii) polymeric or copolymeric methylene ether polyol radical; z is an integer equal to the valency of Z; wherein an asterisk indicates a urethane (—NH—CO—O—) or ureide (—NH—CO—NH—) linkage. Z may also be a polymeric or copolymeric methylene ether polyol radical, giving a group of polymerizable monomers disclosed in U.S. Pat. No. 3,993,815.

Monomers generally characterized as polyurethanes or polyureides, as disclosed in U.S. Pat. No. 3,425,988, may also be used effectively. These monomers are formed from the reaction of an organic polyisocyanate and an acrylate ester having an active hydrogen in the non-acrylate portion of the ester. These monomers may be represented by the general formula:

$$(A—X—CO.NH)_nB \quad\quad\quad (IV)$$

wherein X is —O— or —$R^9$N—; $R^9$ is selected from a group consisting of H or lower alkyls of 1 through 7 carbon atoms; A is $CH_2=CR^{10}.CO.O$—; $R^{10}$ is H or $CH_3$; n is an integer from 2 to 6 inclusive; and B is a polyvalent substituted or unsubstituted alkyl, alkenyl, cycloalkyl, aryl, aralkyl, alkyloxy-alkylene, aryloxy-arylene or heterocyclic radical.

Finally, polymerizable urethane-acrylate monomers disclosed in U.S. patent application Ser. No. 356,679 to O'Sullivan, filed May 2, 1973, now abandoned, particularly Example 3 thereof, may be employed. Typical monomers of this type have the general formula of:

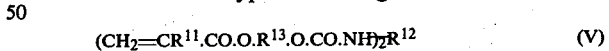

$$(CH_2=CR^{11}.CO.O.R^{13}.O.CO.NH)_zR^{12} \quad\quad\quad (V)$$

wherein $R^{11}$ is H, $CH_3$, $C_2H_5$ or $C_1$; $R^{12}$ is $C_{2-20}$ alkylene, alkenylene or cycloalkylene radical or a $C_{6-40}$ arylene, alkarylene, aralkarylene, alkyloxyalkylene or alkyloxyarylene radical lwhich may be substituted by 1–4 chlorine atoms or by 1–3 amino or mono- or di-$C_{1-3}$ alkylamino or $C_{1-3}$ alkoxy groups. $R^{13}$ is one of the following less one hydrogen atom: (a) a $C_{1-8}$ hydroxy alkyl or aminoalkyl group, (b) a $C_{1-6}$ alkylamino-$C_{1-8}$ alkyl group; or (c) a hydroxyphenyl, an aminophenyl, a hydroxynaphthyl or an aminonaphthyl group which may be further substituted by an alkyl, alkylamino or dialkylamino group, each alkyl group in this subpart (c) containing up to about 3 carbon atoms. Of these, the preferred compositions contain either monomer, VI., of formula:

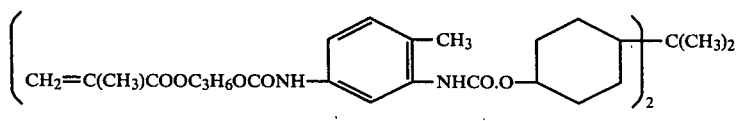

VI.

or monomer VII., of formula:

VII.

or both, (PR represents a propylene triol oligomer residue).

The acrylic rubbers of the instant invention may be selected from a wide range of suitable materials. Most frequently these rubbers are either; (i) a homopolymer of alkyl esters of acrylic or methacrylic acid; (ii) a homopolymer of an alkoxy ester of acrylic or methacrylic acid; (iii) a copolymer of another polymerizable monomer, such as lower alkenes with an alkyl ester of acrylic or methacrylic acid, or with an alkoxy ester of acrylic or methacrylic acid; *(vi) a mixture of any of all of the above (i)–(v). Other unsaturated monomers which may be copolymerized with the alkyl and alkoxy esters of acrylic or methacrylic acid include dienes, reactive halogen-containing unsaturated compounds and other acrylic monomers such as acrylamides.

*(iv) a copolymer of alkyl esters of acrylic or methacrylic acid; (v) a copolymer of alkoxy esters of acrylic or methacrylic acid;

The choice of the acrylic rubber will, to a large degree, dictate various properties and characteristics of the adhesive composition and such choices are easily determined through general experimentation and known methods within the art. It is most effective to use acrylic rubbers whose molecular weight averages more than about 100,000, but any molecular weight greater than 5,000 would be suitable. It is also best to choose an acrylic rubber whose Mooney viscosity is between about 25 and about 60, and whose glass transition temperature (Tg) is 15° C. or less. The Mooney viscosity is defined as the amount of torque or resistance required to revolve a rotor at a constant speed in a polymer at a constant temperature. The Mooney viscosity of the preferred rubbers of the instant invention are described by the manufacturers as ML(1+4). The (1+4) symbol is to indicate the time involved in measuring the polymer viscosity. The "1" indicates a one minute pre-heating time, which is to bring the rotor to the designated temperature. The "4" indicates that the torque reading is to be taken after four minutes of rotating the rotor. The readings are measured on a scale usually of 0–100. There are no specific units involved. However, these specific limitations are not absolute and various acrylic rubbers which do not fall within them may be within the scope of this invention.

One preferred group of acrylic rubbers consists of the copolymers of ethyl acrylate with 2-chloroethyl vinyl ether in the approximate molecular ratio of 95:5, respectively. One such acrylic rubber is manufactured by the B. F. Goodrich Company, and is marketed under the name Hycar 4021. Another preferred acrylic rubber is a copolymer of methyl acrylate and ethylene, manufactured by DuPont, under the name of Vamac N123. A third group of preferred rubbers is manufactured by American Cyanamid and includes rubbers known as Cyanacryl R, Cyanacryl L and Cyanacryl C. The range of acrylic rubber should be about 5 to about 80% by weight, preferably 5–40%.

The Hycar rubbers are high molecular weight rubbers, typically having a Mooney viscosity at 100° C. of between about 25 and 60 ML(1+4), and a glass transition temperature range of about −15° C. to about −40° C. Hycar 4021 has a Mooney viscosity of about 40 minimum and a glass transition temperature (Tg) of about −15° C.

Vamac N123 has a Mooney viscosity of about 30 and a glass transition temperature (Tg) of about −20° C. Cyanacryl R is reported to have a Mooney viscosity of between about 42 to about 51 and a glass transition temperature (Tg) of about −18° C., while Cyanacryl L and C have Mooney viscosities between about 30–48 and glass transition temperatures of −24° C. and −32° C. respectively. This data has been procurred from the manufacturers' technical literature.

All of the above preferred acrylic rubbers are solid materials which, excepting Vamac, must be masticated on a mill prior to dissolution in the acrylic ester monomers. Vamac may be masticated but it is not necessary to do so. Mastication aides the dissolution by breaking down the molecular weight and reducing the physical and chemical cross-links. Properties of the cured adhesive composition will vary somewhat with the degree of mastication, the effects of which may be determined with routine experimentation for any given acrylic rubber. These solid rubbers should show little or no sign of phase separation once fully dissolved in the monomer.

The adhesion promoters of this invention may be chosen from any of those commonly known to the person reasonably skilled in the art. Two types of promoters are preferred. The first type consists of mono- and dicarboxylic acids which are capable of copolymerizing with the acrylate ester monomer. The preferred species of these classes are methacrylic and acrylic acid. Such acids are used in proportions of 1–20% by weight of the composition, preferably in proportion of 1–15%. The second preferred type of adhesion promoter is of the well-known silane type, present in the composition in proportions of 1–10% by weight of the composition.

The free-radical initiator system consists of a free-radical initiator and an accelerator of free radical polymerization, both of which serve to effect rapid polymerization. The free-radical initiators may be of the organic peroxy or hydroperoxy type, perester or peracid type. Especially useful are the perester and peroxide type, among which t-butyl perbenzoate and cumene hydroperoxide are preferred.

Useful initiators include those that can be decomposed by the action of heat or UV light to produce free radicals. They also include other redox polymerization catalysts or any compound capable of generating free radicals. Such compounds can easily be selected by those skilled in the art. For a more detailed discussion see U.S. Pat. Nos. 3,043,820, 3,591,438, 3,616,640, and 3,832,274.

Those free-radical initiators of the photoinitiator type are preferably selected from the group consisting of acetophenones, benzophenones and 1- and 2-acetonaphthones. Additional initiators may be selected from the class consisting of (a) $C_1$ to $C_6$ alkyl diones; (b) metal carbonyls of the formula $M_x(CO)_y$ wherein M is a metal atom, x is 1 or 2, and y is an integer determined by the total valence of the metal atoms; and (c) carbonyl compounds of the general formula $R^{14}(CO)R^{15}$ wherein $R^{14}$ is an alkyl, aryl, aralkyl or alkaryl group containing up to about 10 carbon atoms, and $R^{15}$ is $R^{14}$ or hydrogen; or $R^{14}$ and $R^{15}$ taken together with carbonyl group form an aromatic or heterocyclic ketone containing up to about 16 carbon atoms.

The initiators are usually employed in amounts of about 1% to about 10% by weight of the composition.

The free-radical accelerators of the above-mentioned catalyst system are generally used with good results in concentrations of less than 10% by weight, the preferred range being about 0.1% to about 0.75%. Sulfimides are the preferred group of free-radical accelerators, with the preferred species being 3-oxo-2,3-dihydrobenz[d]isothiazole-1,1-dioxide, commonly known as benzoic sulfimide or saccharin. Tertiary amines may also be employed as accelerators for free-radical production with the preferred amine being N,N-dimethylparatoluidine.

The final essential ingredient in the instant adhesive composition is an activator, which generally comprises the second part of the adhesive composition, the first part being the curable portion of the composition. These activators are intended to be applied on the surface of a substrate to be bonded, usually as a coating or a primer prior to application of the first part of the adhesive composition. However, it is also feasible for the curable portion of the composition to be put on a substrate and the activator applied over it. The preferred activators are generally aldehyde-amine condensation products, the preferred being butyraldehyde-aniline. Activators of this type are sold commercially by Uniroyal under the name Beutene, or by DuPont under the name DuPont 808. The condensation products are usually in a solvent solution such as trichlorethane, or similar solvents, for easy application.

It is optional, but recommended, that chelators, cross-linking agents, and inhibitors be present in the adhesive composition for optimum performance. Chelators and inhibitors are effective in amounts of about 0.1 to about 1% by weight. Ethylenediamine tetra-acetic acid, 2,2-ethylene-bis-nitril methylidyne dipyridine and the class of Beta-diketones are generally the most effective and are preferred. Cross-linking agents, optionally present in amounts from about zero to about 10%, include such compounds as copolymerizable dimethacrylates.

The inhibitor concentration left over in the monomers from manufacture is often high enough for good stability. However, to insure maximum shelf life, the proportions mentioned above are recommended. Of those inhibitors which have been found of adequate utility is the group consisting of hydroquinones, benzoquinones, naphthoquinones, phenanthraquinones, anthraquinones, and substituted compounds of any of the foregoing. Additionally, various phenols can be employed as inhibitors, the preferred one being 2,6-di-tert-butyl-4-methyl phenol.

The amount of thickness, viscosity, or thixotropy desired can be varied in accordance with the particular application required. Thickeners, plasticizers, diluents, and various other agents common to the art can be employed in any reasonable manner to produce the desired characteristics.

The invention will be appreciated further from the examples to follow, which are not meant in any way to restrict the effective scope of the invention.

EXAMPLE 1

Table 1 shows six adhesive compositions, the first five being examples of the toughened adhesives of the instant invention. Formulation number 6 is a control and does not contain an acrylic rubber.

TABLE 1

| INGREDIENTS | 1 | 2 | 3 | 4 | 5 | 6 (control) |
|---|---|---|---|---|---|---|
| | Percent by weight | | | | | |
| Vamac N123 | 30 | 30 | 30 | 30 | 30 | — |
| Methyl methacrylate | 55.5 | — | — | — | — | 85.5 |
| Tetrahydrofurfuryl methacrylate | — | 55.5 | 26.7 | 26.7 | — | — |
| Cyclohexyl methacrylate | — | — | 26.7 | — | — | — |
| Isobornyl methacrylate | — | — | — | 26.7 | — | — |
| Hydroxyethyl methacrylate | — | — | — | — | 55.5 | — |
| Butylene gycol dimethacrylate | 2 | 2 | 2 | 2 | 2 | 2 |
| Methacrylic acid | 10 | 10 | 10 | 10 | 10 | 10 |
| t-butyl perbenzoate | 2 | 2 | 2 | 2 | 2 | 2 |
| Saccharin | 0.5 | 0.5 | 0.5 | 0.5 | 0.5 | 0.5 |
| *Tensile shear strength (psi) | 4350 | 3045 | 3567 | 3407 | 3480 | 4727 |
| **T-peel strength (pli) | 31 | 20 | 31 | 18 | 22 | 6 |

*measured according to ASTM D1002-64 using grit-blasted mild steel.
**measured according to ASTM D1876-69T using grit-blasted aluminum.

Formulations 1–5 in Table 1 indicate that the tensile shear strength at room temperature, of the instant composition is nearly equivalent to similar formulations without the acrylic rubber; e.g., the control formulation 6. However, the T-peel strengths are significantly higher in the rubberized formulations, Nos. 1–5, as compared with the control.

As apparent from the table, the acrylic rubber employed in these formulations is Vamac N123. The polymerizable acrylate ester monomers are represented by methyl methacrylate, tetrahydrofurfuryl methacrylate, isobornyl methacrylate and hydroxyethyl methacrylate. Butylene glycol dimethacrylate is used here as a cross-linking agent and methacrylic acid functions as the adhesion promoter. The free-radical initiator and free-radical polymerization accelerator are represented by t-butyl perbenzoate and saccharin respectively.

EXAMPLE 2

This example is designed to demonstrate the significantly improved heat resistance the instant acrylic rubber-based compositions have over the chlorosulfonated polyethylene rubber (Hypalon 20) of the prior art.

As indicated in Table II, at room temperature the tensile and T-peel strengths of the instant invention, represented by formulation 7, are essentially equivalent to those of the prior art (control formulation 8). However, the strengths of formulation 8, containing the chlorosulfonated polyethylene rubbers, decrease substantially after exposure for one week to temperatures of 180° C. Formulation 9 exhibits only a slight decrease in tensile shear strength after such exposure to high temperature, demonstrating a significant improvement over the prior art. The T-peel strength of this formulation is nearly double that of the control, again indicating compositions of the instant invention are far superior in their heat resistant properties than the typical polymer-in-monomer adhesives of the prior art.

The functional role of each of these ingredients is described in Example 1.

TABLE 2

| INGREDIENTS | FORMULATION NO. | |
|---|---|---|
| | 7 | 8 (control) |
| | Percent by Weight | |
| Vamac N123 | 30.0 | — |
| Hypalon 20 | — | 35.0 |
| Methyl methacrylate | 55.5 | 48.25 |
| Butylene glycol dimethacrylate | 2.0 | 1.0 |
| Methacrylic acid | 10.0 | 10.0 |
| t-butyl perbenzoate | 2.0 | — |
| Saccharin | 0.5 | — |
| Cumene hydroperoxide | — | 0.5 |
| Epoxy resin | — | 5.0 |
| Stabilizer | — | 0.25 |
| TENSILE SHEAR (psi) | | |
| 72 hours room temperature cure | 3988 | 4350 |
| Room temperature cure 72 hours, followed by heat aging at 180° C. for one week | 3828 | 1551 |
| T-PEEL (pli) | | |
| 72 hours room temperature cure | 30 | 28 |
| Room temperature cure 72 hours, followed by heat aging at at 180° C. for one week | 15 | 9 |

EXAMPLE III

Formulations 9 and 10 demonstrate the excellent heat resistance properties of two particular preferred acrylic rubbers; cyanacryl R and Hycar 4021-45.

| INGREDIENTS | FORMULATION NO. | |
|---|---|---|
| | 9 | 10 |
| | Percent by weight | |
| Cyanacryl R | 25 | — |
| Hycar 4021-45 | — | 26.6 |
| Methyl Methacrylate | 60.5 | 58.9 |
| Methacrylic acid | 10 | 10 |
| Butylene glycol dimethacrylate | 2 | 2 |
| T-butyl perbenzoate | 2 | 2 |
| Saccharin | 0.5 | 0.5 |
| *Tensile Shear (psi) | | |
| room temperature cure one week | 4060 | 4901 |
| heat age at 180° C. for one week | 2900 | 3379 |
| **T-PEEL (pli) | | |
| room temperature cure one week | 20 | 11 |
| heat age at 180° C. for one week | — | 21 |

*grit-blasted mild steel laps - ASTM D1002-64
**grit-blasted aluminum - ASTM D1876-69T

We claim:

1. In a two-component adhesive composition of the type having a first component comprising a solution of polymer in at least one polymerizable monomer in combination with an adhesion promoter and a free radical catalyst system, and a second component comprising an activator, an improved composition providing increased high temperature resistance in the cured adhesive wherein: said polymer is present at levels of 30% or more of the total composition and is a copolymer of ethylene and methyl acrylate having a glass transition temperature below 15° C., a Mooney viscosity of between about 25 and about 60 ML (1+4) at 100° C. and a molecular weight in excess of 5,000; said monomer is an acrylate ester; and said composition when cured does not exhibit significantly decreased shear strength after high temperature aging when compared to the shear strength of said composition when cured at room temperature.

2. The composition of claim 1, wherein the acrylate ester monomer is selected from the class consisting of monofunctional monomers represented by the formula:

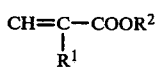

wherein $R^1$ is H, $CH_3$ or lower alkyl; $R^2$ is alkyl, cycloalkyl, alkylhydroxy, alkylene or tetrahydrofurfuryl.

3. The composition of claim 2, wherein the acrylate ester monomer is selected from the group consisting of methyl methacrylate, cyclohexyl methacrylate, tetrahydrofurfuryl methacrylate, isobornyl methacrylate, hydroxyethyl methacrylate and hydroxypropyl methacrylate.

4. The composition of claim 1, wherein the acrylate ester monomer is a mixture of mono- and poly-functional acrylates and wherein the polyfunctional acrylate is present in amounts of between about 1% and 40% by weight of the total composition.

5. The composition of claim 4, wherein the monofunctional acrylate is selected from the group consisting of methyl methacrylate, tetrahydrofurfuryl methacrylate, cyclohexyl methacrylate, isobornyl methacrylate and hydroxyethyl methacrylate, and the polyfunctional acrylate is a glycol dimethacrylate.

6. The composition of claim 5, wherein the glycol dimethacrylate is butylene glycol dimethacrylate.

7. The adhesive composition of claim 1, wherein the activator is an aldehyde-amine condensation product.

8. The adhesive composition of claim 7, wherein the aldehyde-amine condensation product is butyraldehyde-aniline.

9. The adhesive composition of claim 7, wherein the second component consists of a solution of said aldehyde-amine condensation product in an inert solvent.

10. The composition of claim 1, wherein the second component further comprises a free-radical polymerizable component.

11. The adhesive composition of claim 1, wherein the adhesion promoter is selected from the group consisting of acrylic and methacrylic acid.

12. The adhesive composition of claim 1, wherein the adhesion promoter is a silane.

* * * * *